United States Patent [19]

Coughlan et al.

[11] 4,059,564
[45] Nov. 22, 1977

[54] METHOD OF APPLYING AN INTEGRAL SEALING MEMBER

[75] Inventors: Standly T. Coughlan, Huron, Ohio; John H. Dewar; Henry A. Zampa, both of Grosse Ile, Mich.

[73] Assignee: Ford Motor Company, Dearborn, Mich.

[21] Appl. No.: 581,254

[22] Filed: May 27, 1975

[51] Int. Cl.² .......................................... B29D 27/00
[52] U.S. Cl. .................................. 264/46.4; 249/159; 264/236; 264/271; 264/294; 264/295; 264/296; 296/31 R; 425/DIG. 44; 425/DIG. 47; 428/159
[58] Field of Search ............... 264/271, 250, 294, 295, 264/347, DIG. 66, 46.4, 46.7, 46.6, 296, 236; 296/31 P, 76, 31 R; 425/109, 127; 428/174; 220/75

[56] References Cited

U.S. PATENT DOCUMENTS

| 1,276,624 | 8/1918 | Cummings | 264/271 X |
|---|---|---|---|
| 1,278,111 | 9/1918 | Cummings | 264/271 X |
| 2,719,331 | 10/1955 | Harris | 264/46.7 |
| 2,934,989 | 5/1960 | Belli et al. | 220/75 |
| 3,011,218 | 12/1961 | Mitten | 264/45.8 |
| 3,068,043 | 12/1962 | Komenda | 296/31 P |
| 3,068,136 | 12/1962 | Reid | 264/271 X |
| 3,079,641 | 3/1963 | Knox et al. | 264/54 |
| 3,159,886 | 12/1964 | Lynch | 264/46.7 X |
| 3,235,633 | 2/1966 | Holloway et al. | 264/46.7 X |
| 3,263,014 | 7/1966 | Deisenroth | 425/127 X |
| 3,493,257 | 2/1970 | Fitzgerald et al. | 296/31 P X |
| 3,583,756 | 6/1971 | Wilfert | 296/31 P |
| 3,741,515 | 6/1973 | Rice | 249/159 X |
| 3,837,957 | 9/1974 | Mesnel | 264/285 X |
| 3,995,082 | 11/1976 | Minhinnick et al. | 428/159 |

FOREIGN PATENT DOCUMENTS

| 1,457,930 | 9/1966 | France | 264/295 |

OTHER PUBLICATIONS

Whittington, Lloyd R. "Whittington's Dictionary of Plastics," Stamford, Conn., Technomic, c1968, pp. 59-60.

*Primary Examiner*—Philip Anderson
*Attorney, Agent, or Firm*—Roger L. May; Keith L. Zerschling

[57] ABSTRACT

A method of applying an integral sealing member to a shaped surface which in its operative environment is to be disposed in sealed relationship with another surface and the resulting products. The method comprises dispensing a composition adapted to be cured to form said sealing member onto a work surface adapted to be adjusted to a desired configuration, partially curing said composition such that it does not flow, adjusting the disposition of said work surface bearing the partially cured composition such that said shaped surface to which the sealing member is to be integrally bonded may be disposed along said work surface, positioning said shaped surface along said work surface such that said shaped surface is at least in contact with said partially cured composition, completing the curing of said composition and removing said shaped surface with said sealing member integrally bonded thereto from said work surface. The invention has particular significance with respect to the application of sealing members to various automotive parts.

8 Claims, 10 Drawing Figures

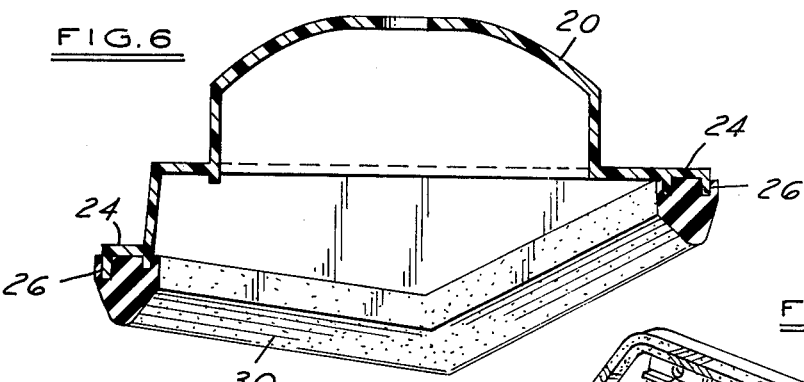
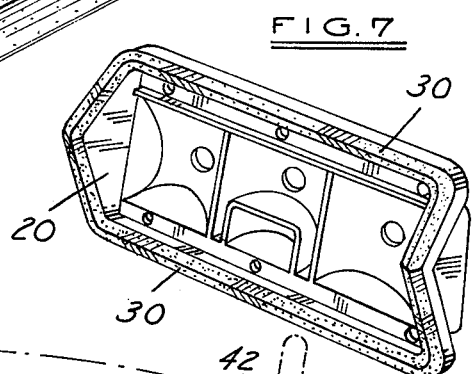
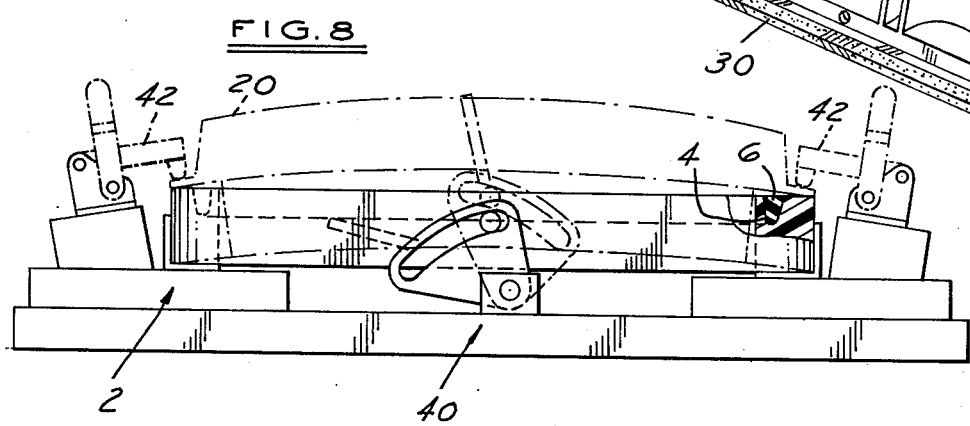
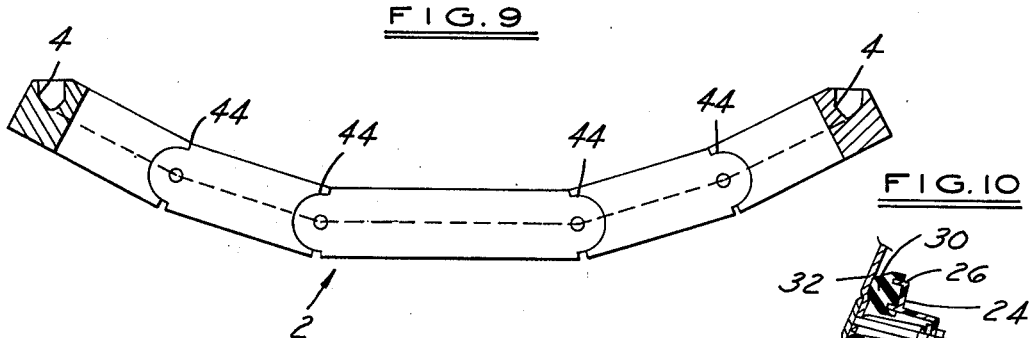
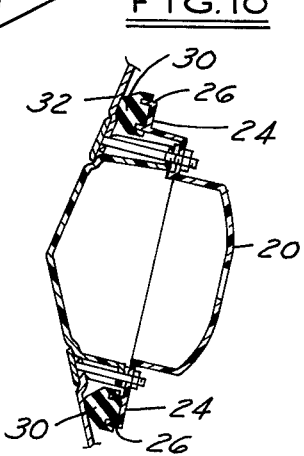

METHOD OF APPLYING AN INTEGRAL SEALING MEMBER

This application relates to a method of applying an integral sealing member (i.e., a member which is bonded to a surface without adhesive) to a surface which in its operative environment is to be disposed in sealed relationship with another surface. More particularly, this application relates to the application of an integral elastomeric seal or gasket to the shaped surface of a body to be maintained in liquid and dust tight sealed relationship with another surface. Still more particularly, this invention relates to the application of such an integral sealing member or gasket to a surface member which is essentially nonplanar in contour, i.e., curved or disposed in various planes.

It will be appreciated by those skilled in the art that the process of this invention is useful for the application of integral sealing members to any type of surface member requiring such a seal or gasket. The invention is particularly applicable to the application of sealing members to automotive parts and for purposes of discussion the process will be discussed in terms of automotive applications. However, it should be kept in mind that the particular applications discussed are merely exemplary and are not intended to be limiting.

Prior art techniques for applying sealing members or gaskets to various automotive parts such as doors, ornamentation, glass, deck lids, lamp bodies, lamp lenses, drip rails, air cleaners, etc., and any other parts where a weather strip is required have commonly involved application of a premanufactured, molded or die-cut seal or gasket by a gluing or mechanical fastening operation. Such techniques have suffered from a number of disadvantages which are obviated by the process of this application and the resultant integral seal or gasket. A clear advantage of using parts bearing integral seals or gaskets in production is that their use results in a cost savings due to complexity reduction. For example, use of parts with integral seals as opposed to applying seals in the plant has the following advantages: (1) elimination of the purchase of individual molded or die-cut seals from suppliers; (2) elimination of storage of such seals as well as handling, packaging, scheduling and shipping thereof; (3) reduction in mold complexity in preparing molded seals; (4) reduced man hours for problem solving and tooling changes; (5) styling flexibility; and (6) maximum coordinated fit and location of the seals to components and functional mounting surfaces by eliminating manual gluing or mechanical fastening of seals or gaskets, a step which can cause quality control problems because of poorly fitting seals or seals which are not properly located on the part.

Manual application of seals or gaskets to parts may be particularly difficult in those instances where the surface member to which the seal is to be applied is shaped, and in particular where the surface member is nonplanar, i.e., curved or lying in two or more planes. The process of the subject invention results in particularly significant advantages for such parts inasmuch as problems associated with fitting seals or gaskets to the parts are eliminated. Unlike seals or gaskets which are manually applied (e.g., using glue), seals or gaskets applied by the process of this invention are integrally bonded to the surface member no matter what the shape or contour thereof and the resultant seal achieved is decidedly superior to that which may be achieved by a manually applied seal or gasket.

The process of the invention which achieves the advantages discussed above by application of an integral sealing member to a shaped surface member which in its operative environment is to be disposed in sealed relationship with another surface comprises dispensing a composition adapted to be cured to form said sealing member onto a work surface adapted to be adjusted to a desired configuration, partially curing the composition such that it does not flow, adjusting the disposition of said work surface bearing said partially cured composition such that said shaped surface member to which said sealing member is to be applied may be disposed along said work surface member, positioning said shaped surface member along said work surface member such that said shaped surface member is at least in contact with said partially cured composition, completing the curing of said composition and removing said shaped surface member from said work surface with said sealing member integrally bonded thereto.

When the method of the invention is used for applying sealing members to nonplanar surface members, it may comprise: dispensing said composition into a groove disposed essentially in one plane; partially curing the composition; adjusting the disposition of the groove containing the partially cured composition such that the groove is no longer disposed in one plane and such that the nonplanar surface member to which the sealing member is to be applied may be disposed along the groove, positioning the nonplanar surface member along or within said groove such that at least a portion thereof is at least in contact with, and preferably embedded in, said composition along the entire portion to which the sealing member is to be applied, completing curing of the composition and removing the shaped surface member from the groove with the sealing member integrally bonded thereto.

The method of the invention will be better understood by reference to the following detailed description of several preferred embodiments of the invention when read in conjunction with the drawings in which:

FIG. 6 is a sectional view of the part produced by the process as shown in FIG. 5;

FIG. 7 is a perspective view of a lamp body to which a sealing member has been applied along the periphery thereof;

FIG. 8 is a perspective view showing the mode of operation of the mold of FIG. 2;

FIG. 9 is a view of a multi-hinged mold suitable for use in the process of the invention; and FIG. 10 is a cross sectional view showing the application of the lamp body of FIG. 7 in its operative environment along with a lamp being secured to a vehicle lower back panel by means of a lamp door and fasteners.

DESCRIPTION OF PREFERRED EMBODIMENTS OF THE INVENTION

As discussed above, the method of this invention, while being applicable to the manufacture of any seal or gasket bearing body which in its operative environment is to be disposed in sealed relationship with another surface, is particularly useful in the application of integral seals or gaskets to automotive parts and in particular to those parts having a nonplanar surface to which a seal is to be applied. One particular type of part which is exemplary of those to which integral seals or gaskets may be applied in accordance with the invention are automotive lamp bodies. The detailed description of the invention which follows will be discussed in terms of the manufacture of such integral seal or gasket bearing lamp bodies.

Figure 1:
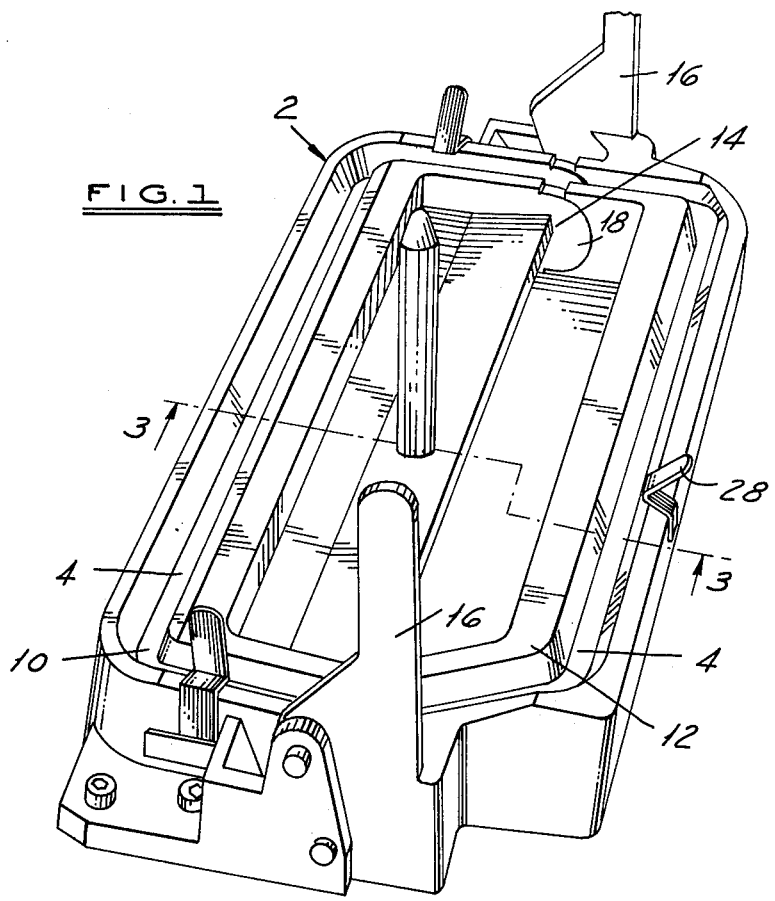
FIG. 1 is a perspective view of a hinged mold suitable for carrying out the process.
Figure 2:
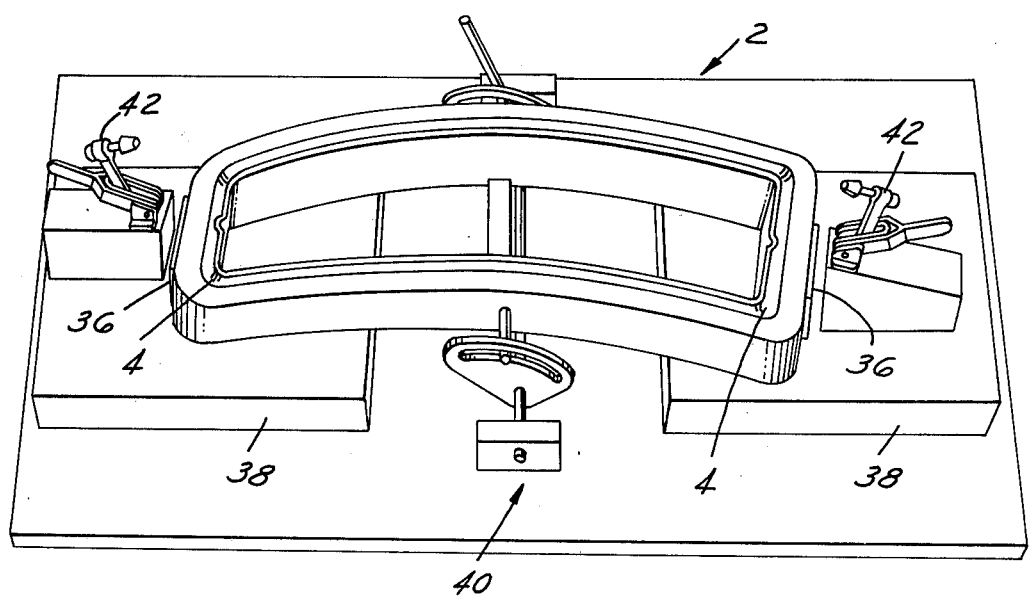
FIG. 2 is a perspective view of a flexible mold suitable for carrying out the process.
Figure 3:
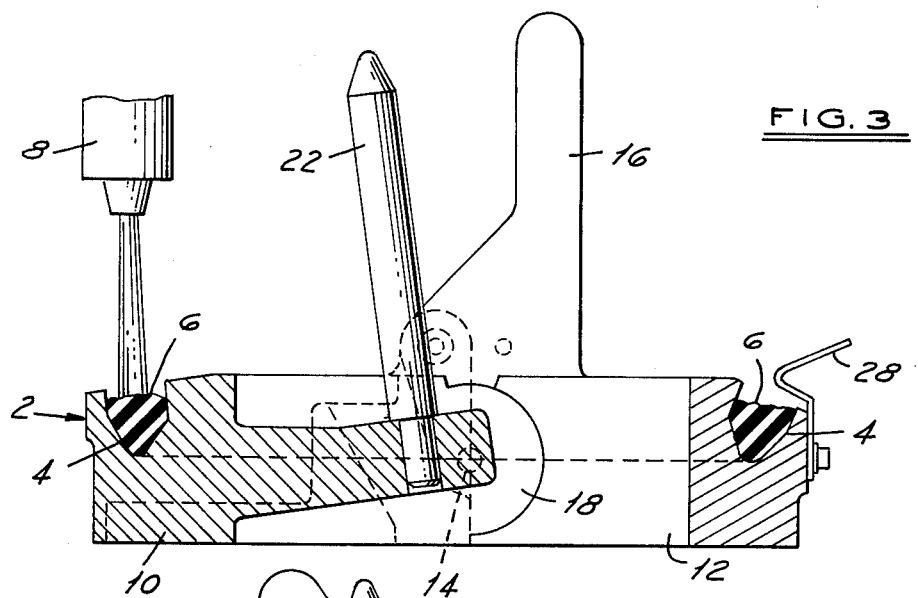
FIG. 3 is a sectional view of the mold of FIG. 1 taken along line 1—1 when the mold is disposed in a planar position.
Figure 4:
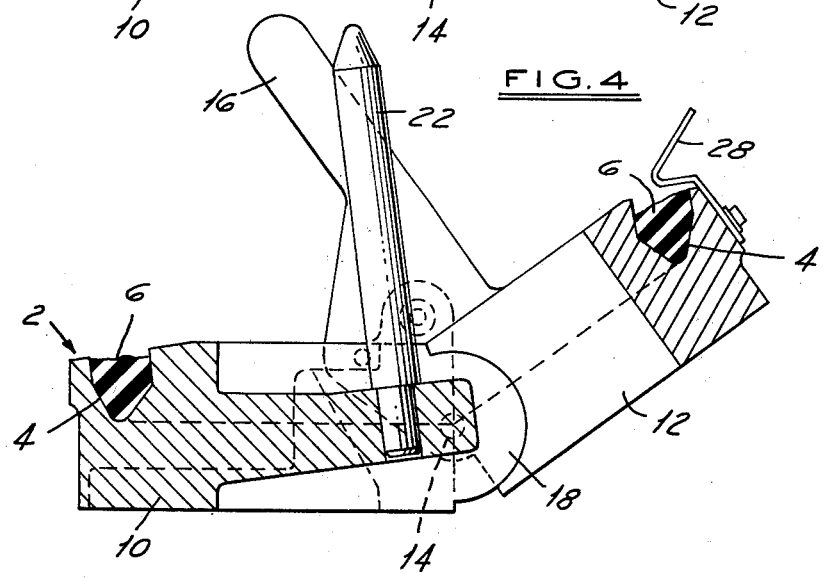
FIG. 4 is a cross-sectional view of the mold of FIG. 1 taken along line 1—1 when the mold is adjusted to a nonplanar position.
Figure 5:
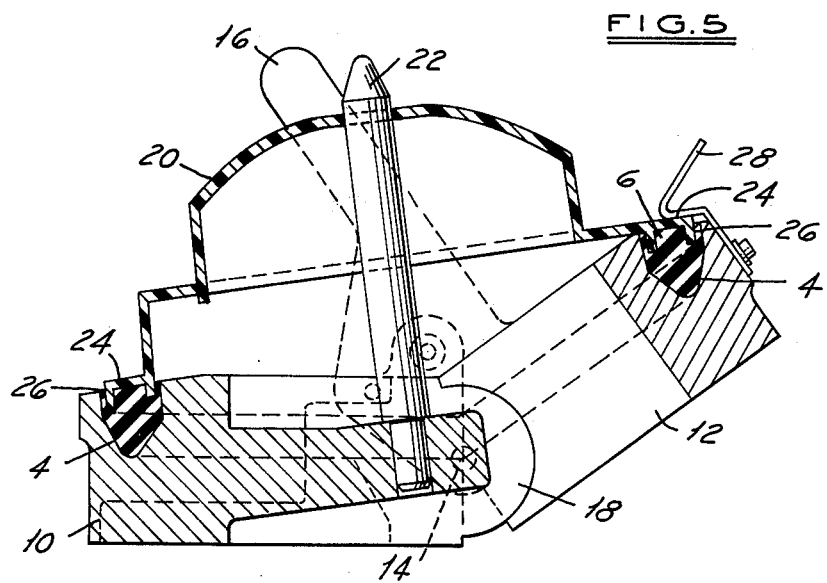
FIG. 5 is a cross sectional of the mold of FIG. 1 taken along line 1 when the mold is in a nonplanar position and with a part to which a sealing member is to be applied positioned thereon.

FIGS. 1 and 2 are perspective views of two mold assemblies generally indicated at 2 which are suitable for carrying out the process of the invention. Each mold assembly includes a groove 4 disposed about the periphery thereof and adapted to receive a composition to be cured to form the desired sealing member. FIGS. 3 through 5 are sectional views of the mold assembly of FIG. 1 taken along line 1—1. These figures depict the method of the invention as it may be practiced using the mold assembly of FIG. 1. As shown in FIG. 3, the sealing or gasket member composition 6 is dispensed from a dispensing means such as nozzle 8 into groove 4 of mold assembly 2 to the desired depth while the groove is disposed in essentially one plane.

Composition 6 which is dispensed into groove 4 may be any material suitable for forming a seal or gasket and the final properties of the material when cured or set will vary depending on the desired use for the finished product. Preferably, however, the composition is an elastomer, i.e., any of a number of natural or synthetic high polymers having unique properties of deformation (elongation or yield under stress) and elastic recovery after curing by crosslinking or by fusing in the case of a plasitsol. A particularly preferred class of elastomers for forming the seals or gaskets in accordance with the process of the invention are urethane elastomers. These compositions, which are usually prepared from a long chain diol such as a linear polyester or polyether of molecular weight 1,000 to 2,000 a diisocyanate and a low molecular weight "chain extender" such as a glycol or a diamine are well known in the elastomer art and the selection of the particular composition needed for the particular application may be made by the artisan without undue experimentation.

As elastomeric material which is particularly well suited for the formation of gaskets or seals in accordance with the invention and which is a preferred composition for seals or gaskets on automotive lamp bodies is a polyurethane which may be foamed after dispensing. Such urethane foam materials are normally prepared from diisocyanate and hydroxyl terminated resins such as polyethers and polyesters and a blowing agent. Linear or only slightly branched resins are used to provide flexible foams whereas more highly branched resins produce more rigid foams. As mentioned above, one skilled in the elastomer art will, without undue experimentation, vary the particular composition to obtain the desired properties in the final product. Elastomers suitable for use in the process of this invention are widely described in the prior art. For example, the preparation of various polyurethane elastomers, both foamed and unfoamed, is described in Saunders, J. H. and Frisch, K. C., *Polyurethanes, Chemistry and Technology*. Interscience Publishers, New York, 1962.

By way of example, it has been found that elastomeric compositions such as polyurethane foams for the preparation of automotive lamp seals or gaskets ideally have the following properties: (1) a density (ASTM D-1564) of 15-25 pounds/cubic feet; (2) a tensile strength (ASTM D-1564, 0.5 inch thick samples) of at least 20 psi; (3) elongation at break (ASTM D-1564, 0.5 inch thick sample) of at least 60%; (4) a tear resistance (ASTM D-624, 0.5 inch thick sample) of at least 5 psi; (5) a split tear resistance (ASTM D-1564, 0.5 inch thick sample) of at least 2 psi; (6) a compression set (ASTM D-1564, method "B", 22 hours at $158° \pm 2°$ F 50% constant deflection, $2 \times 2 \times \frac{1}{2}$ inch, calculate the constant deflection compression set, expressed as a percentage of the original deflection) of at least 25%; (7) compression deflection (ASTM D-1564, $0.5 \times 2 \times 2$ inch sample 25% compression and 2 inches/minute) of 3 to 9 psi; (8) no cracking or deterioration after aging; (9) no cracking after exposure to a temperature of $-40°$ F for a minimum of 4 hours followed by bending 180° over a temperature conditioned mandrel; (10) a maximum water absorption of 5% when immersed in water at room temperature for 24 hours; (11) a homogeneous, fine cell structure free of internal defects; (12) no surface degradation beyond 1/16inch after 250 hours exposure in a weatherometer; (13) no migration of paint stains; and (14) a Shore "00" Durometer reading of $55 \pm 5$.

After dispensing composition 6 into groove 4 to the desired depth, the composition is partially cured or set in a suitable manner, e.g., by heating, to the extent that it will not flow substantially when the orientation of groove 4 is changed. Subsequent to this partial setting or curing operation the mold assembly 2 is adjusted such that groove 4 containing the partially cured composition 6 is no longer in one plane and such that the configuration of groove 4 matches that nonplanar surface to which the sealing member or gasket is to be integrally bonded.

As will be noted by referring to FIGS. 3-5, the mold assembly of FIG. 1 comprises 2 sections 10 and 12 which are hinged at 14 so as to allow mold assembly 2 to be adjusted from a single plane to various two-plane configurations by moving lever 16. As can be seen most clearly in FIG. 1, groove 4 extends continuously about the periphery of the mold assembly 2. It is, of course, necessary when applying a continuous seal or gasket member to a body that the groove 4 and composition 6 remain continuous about the periphery of assembly 2 even when sections 10 and 12 are adjusted to the two-plane configurations. Hinge means 18 is adapted to achieve this result.

After mold assembly 2 is adjusted such that sections 10 and 12 are disposed in two planes as shown in FIG. 4 body 20 to which the integral seal or gasket is to be applied is seated as shown on FIG. 5 on the mold using guide pin 22 with the surface 24 which resides in several planes corresponding to those of mold assembly 2 embedded as designed in partially set or cured composition 4. If desired, a flange 26 may be provided on nonplanar surface 24 such that a greater surface area may be exposed to composition 4 and a stronger integral bond thereby achieved.

Bracket 28 serves to hold body 20 in mold assembly 2. With body 20 held in place with nonplanar surface 24 at least partially embedded composition 6, is cured by suitable means to form a strong, integral bond. The particular manner of curing will be apparent to the skilled artisan depending on the composition employed.

After curing, body 20 is removed from mold assembly 2. FIG. 6 shows a sectional view of such a body with seal or gasket 30 applied to the nonplanar surface 24 and extending about the periphery of the body. FIG. 7 shows a perspective view of a lamp body 20 to which an integral seal 30 has been applied using mold assembly 2. FIG. 10 shows a vertical sectional view of such a lamp body 20 in its operative environment wherein integral seal 30 bonded to nonplanar surface 24 bearing flange 26 is in water and dust tight sealed relationship with surface 32.

FIG. 2 shows another type of mold assembly generally indicated at 2 which may be employed to apply integral seals in accordance with the process of the invention. The mold assembly shown in this figure is formed from a flexible material such as an elastomer and contains no hinged sections. The nonplanar configuration is afforded to the mold assembly by bowing the center portion of the assembly upward through the use of cam action to provide the desired curvature to the groove 4 disposed about the periphery of the mold assembly 2. The mold assembly 2 is, of course, secured to support blocks 38 at 34 and 36. The process is carried out employing this mold assembly in the same manner as with respect to the assembly shown in FIG. 1. FIG. 8 shows a sectional view depicting the operation of the process employing this molding assembly. The cam action necessary to provide the nonplanar configuration to the mold assembly is generally indicated at 40. The assembly 2 is shown in both the planar configuration and the nonplanar configuration produced after bowing subsequent to partially curing composition 6. Body 20 is shown in broken lines secured on mold assembly 2 by pins 42.

FIG. 9 shows still another embodiment of a mold assembly generally indicated at 2 which may be employed to practice the process of the invention. This embodiment comprises a multi-hinged mold comprising numerous sections hinged at 44 to allow for continuity of groove 4 around the entire periphery of assembly 2. Such a multi-hinged asembly may be employed to apply seals or gaskets to bodies having nonplanar surfaces which reside in a number of planes and yet are not curved in the manner of bodies which are processed using the mold assembly shown in FIGS. 2 and 8.

It will be appreciated athat the mold assemblies shown in the drawings and the discussion of the process of the invention in terms of the use of such mold assemblies is presented merely by way of example and is not intended to be limiting. It will be apparent to those skilled in the art that various mold configurations may be employed in practicing the process of the invention as defined by the appended claims.

We claim:

1. A method for applying an integral sealing member to a non-planar surface member comprising:
   A. dispensing an elastomer composition adapted to be cured to form said sealing member into a groove in a mold member which is disposed essentially in one plane; said mold member being adapted to have at least a portion thereof adjusted from a planar to various non-planar positions;
   B. partially curing said composition such that it does not flow;
   C. adjusting the disposition of at least a portion of said mold member having said groove therein and containing said partially cured composition such that said groove is no longer disposed in one plane and such that said nonplanar surface member may be embedded within the composition within said groove along the entire portion thereof to which said sealing member is to be applied;
   D. positioning said non-planar surface member within said groove containing said partially cured composition such that at least a portion thereof is embedded therein along the entire portion thereof to which said sealing member is to be applied;
   E. completing the curing of said composition; and
   F. removing said non-planar surface with said sealing member integrally bonded thereto from said groove.

2. A process in accordance with claim 1 wherein said mold is flexible such that it can be bent into various desired configurations.

3. A process in accordance with claim 2 wherein said mold is hinged in at least one place.

4. A method in accordance with claim 3 wherein said mold is hinged in two or more places.

5. A method in accordance with claim 2 wherein said mold is formed from an elastomeric material.

6. A process in accordance with claim 1 wherein said material is a foamable elastomeric material.

7. A process in accordance with claim 6 wherein said material is a foamable polyurethane.

8. A process in accordance with claim 1 wherein said non-planar surface comprises a flange disposed about the perimeter of a body to which said sealing member is to be applied.

* * * * *